United States Patent
Matsushita et al.

(10) Patent No.: US 11,363,150 B2
(45) Date of Patent: Jun. 14, 2022

(54) IMAGE MANAGEMENT APPARATUS, IMAGE MANAGEMENT METHOD, COMMUNICATION APPARATUS, CONTROL METHOD, AND STORAGE MEDIUM

(71) Applicant: CANON KABUSHIKI KAISHA, Tokyo (JP)

(72) Inventors: Takahiro Matsushita, Tokyo (JP); Tatsuya Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/171,379

(22) Filed: Feb. 9, 2021

(65) Prior Publication Data

US 2021/0250449 A1  Aug. 12, 2021

(30) Foreign Application Priority Data

Feb. 10, 2020  (JP) .............................. JP2020-020891

(51) Int. Cl.
| | |
|---|---|
| *H04N 1/00* | (2006.01) |
| *H04N 5/232* | (2006.01) |
| *H04N 5/235* | (2006.01) |
| *H04N 5/265* | (2006.01) |
| *H04N 5/28* | (2006.01) |

(52) U.S. Cl.
CPC ..... *H04N 1/00183* (2013.01); *H04N 1/00143* (2013.01); *H04N 1/00172* (2013.01); *H04N 5/2353* (2013.01); *H04N 5/232127* (2018.08); *H04N 5/265* (2013.01); *H04N 5/28* (2013.01)

(58) Field of Classification Search
CPC .......... H04N 1/00183; H04N 1/00143; H04N 1/00172; H04N 5/232127; H04N 5/2353; H04N 5/265
See application file for complete search history.

(56) References Cited

U.S. PATENT DOCUMENTS

2015/0286898 A1* 10/2015 Di ........................... G06F 16/58
382/224

FOREIGN PATENT DOCUMENTS

| JP | 2003143350 A | * | 5/2003 |
|---|---|---|---|
| JP | 2015-220616 A | | 12/2015 |
| JP | 2019-148994 A | | 9/2019 |
| JP | 2020-009114 A | | 1/2020 |

* cited by examiner

*Primary Examiner* — Ahmed A Berhan
(74) *Attorney, Agent, or Firm* — Cowan, Liebowitz & Latman, P.C.

(57) ABSTRACT

There is provided an image management apparatus. A first receiving unit receives an image from a communication apparatus. A sending unit sends the image and an evaluation request for the image to an image evaluation apparatus configured to perform evaluation with respect to likelihood that another user will purchase the image. A second receiving unit receives an evaluation result for the image from the image evaluation apparatus. A registering unit registers the image in a server apparatus configured to provide an image sales service, in a case where the evaluation result indicates that the likelihood satisfies a predetermined standard and information, which indicates that a user consents to having the image registered in the server apparatus, is set in the image.

11 Claims, 9 Drawing Sheets

IMAGE MANAGEMENT APPARATUS, IMAGE MANAGEMENT METHOD, COMMUNICATION APPARATUS, CONTROL METHOD, AND STORAGE MEDIUM

BACKGROUND OF THE INVENTION

Field of the Invention

The present invention relates to an image management apparatus, an image management method, a communication apparatus, a control method, and a storage medium.

Description of the Related Art

There are sales services which allow members to view registered images and purchase images they like. With such a sales service, images which meet a predetermined standard under which the images are expected to be purchased are selected for registration. As such, even if an image is considered to be good by a user, it is not necessarily the case that the image will be selected (registered) by the sales service, if the user cannot understand the selection standard and an image they shot is not selected, they may less motivated to use the sales service. This has caused a problem in that the number of users using the sales service drops and the sales service can no longer collect a sufficient number of images.

With respect to image evaluation, a method is known in which trends of each of SNSs are analyzed over time to evaluate images, and users are then notified (Japanese Patent Laid-Open No. 2020-009114). Additionally, a method is known in which when a user posts a shot image to an SNS, a suitable SNS where the image can receive a good evaluation is selected on the basis of related information of the image (Japanese Patent Laid-Open No. 2015-220616). Furthermore, a method is known in which shot images are selectively transferred to an external apparatus on the basis of rating information added to the shot images (Japanese Patent Laid-Open No. 2019-148994).

The method of Japanese Patent Laid-Open No. 2020-009114 is a configuration only for evaluating and providing a notification for an image obtaining a positive evaluation, and cannot implement a system for automatically collecting images with sale value. Additionally, the method of Japanese Patent Laid-Open No. 2015-220616 is a configuration for selecting an appropriate SNS in which a favorable evaluation can be obtained, and cannot implement a system for automatically collecting images with sale value. Additionally, the method of Japanese Patent Laid-Open No. 2019-148994 is a configuration for selecting an image on the basis of rating information, and cannot implement a system for automatically collecting images with sale value.

SUMMARY OF THE INVENTION

Having been conceived in light of such circumstances, the present invention provides a technique which prompts a user to register, in an image sales service, an image having a relatively high likelihood of being purchased by another user, while suppressing a burden on the user.

According to a first aspect of the present invention, there is provided an image management apparatus comprising: a first receiving unit configured to receive an image from a communication apparatus; a sending unit configured to send the image and an evaluation request for the image to an image evaluation apparatus configured to perform evaluation with respect to likelihood that another user will purchase the image; a second receiving unit configured to receive an evaluation result for the image from the image evaluation apparatus; and a registering unit configured to register the image in a server apparatus configured to provide an image sales service, in a case where the evaluation result indicates that the likelihood satisfies a predetermined standard and information, which indicates that a user consents to having the image registered in the server apparatus, is set in the image.

According to a second aspect of the present invention, there is provided an image management method executed by an image management apparatus, comprising: receiving an image from a communication apparatus; sending the image and an evaluation request for the image to an image evaluation apparatus configured to perform evaluation with respect to likelihood that another user will purchase the image; receiving an evaluation result for the image from the image evaluation apparatus; and registering the image in a server apparatus configured to provide an image sales service, in a case where the evaluation result indicates that the likelihood satisfies a predetermined standard and information, which indicates that a user consents to having the image registered in the server apparatus, is set in the image.

According to a third aspect of the present invention, there is provided a communication apparatus configured to communicate with an image management apparatus configured to register an image in a server apparatus configured to provide an image sales service, comprising: a setting unit configured to, in response to an instruction from a user, set information, which indicates that a user consents to having an image registered in the server apparatus configured to provide the image sales service, in the image; and a sending unit configured to send the image to the image management apparatus.

According to a fourth aspect of the present invention, there is provided a control method of a communication apparatus configured to communicate with an image management apparatus configured to register an image in a server apparatus configured to provide an image sales service, the control method comprising: in response to an instruction from a user, setting information, which indicates that a user consents to having an image registered in the server apparatus configured to provide the image sales service, in the image; and sending the image to the image management apparatus.

According to a fifth aspect of the present invention, there is provided a non-transitory computer-readable storage medium which stores a program for causing a computer to execute an image management method comprising: receiving an image from a communication apparatus; sending the image and an evaluation request for the image to an image evaluation apparatus configured to perform evaluation with respect to likelihood that another user will purchase the image; receiving an evaluation result for the image from the image evaluation apparatus; and registering the image in a server apparatus configured to provide an image sales service, in a case where the evaluation result indicates that the likelihood satisfies a predetermined standard and information, which indicates that a user consents to having the image registered in the server apparatus, is set in the image.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
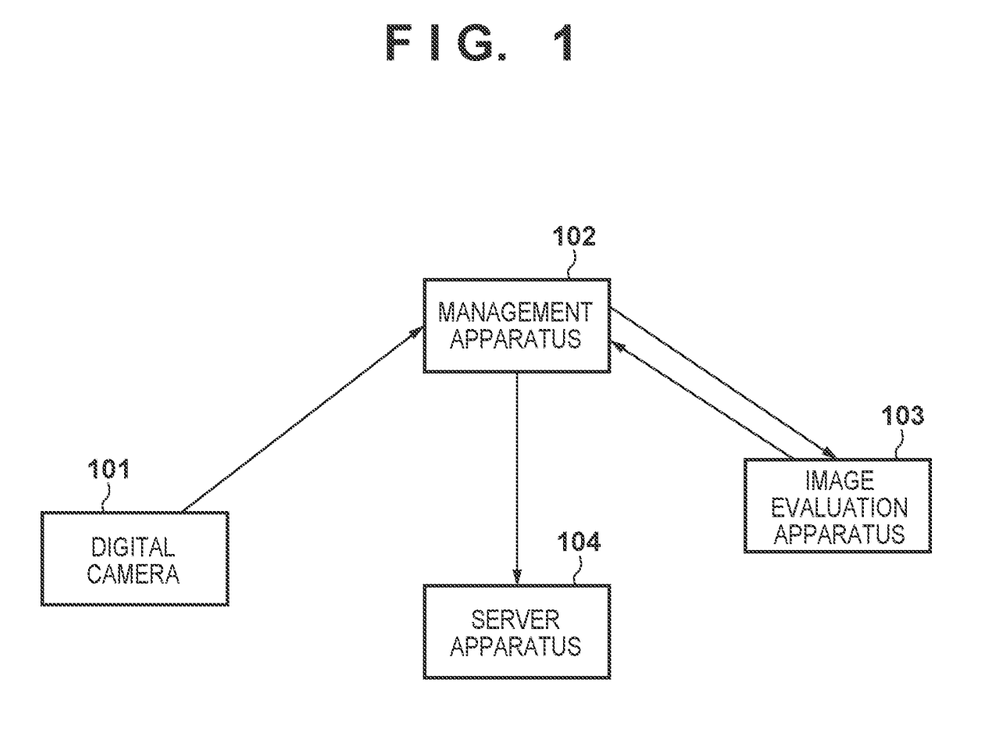
FIG. 1 is a diagram illustrating the configuration of a system including a digital camera 101 (a communication apparatus), a management apparatus 102, an image evaluation apparatus 103, and a server apparatus 104.

FIG. 1 is a diagram illustrating the configuration of a system including a digital camera 101 (a communication apparatus), a management apparatus 102, an image evaluation apparatus 103, and a server apparatus 104 according to a first embodiment. The example described here assumes that the management apparatus 102 is a computer which runs a cloud-based app, and the image evaluation apparatus 103 is a computer that provides a cloud-based service. However, for example, the management apparatus 102 may be a computer that executes a PC app or a mobile app, and the image evaluation apparatus 103 may be a computer that executes a PC app or a mobile app. Furthermore, although the digital camera 101 is given as an example of a communication apparatus here, a portable media player, a so-called tablet device, a personal computer, or the like can be given as other examples of communication apparatuses.

To receive services using the management apparatus 102, the image evaluation apparatus 103, and the server apparatus 104, it is necessary for the user to create an account in advance. The management apparatus 102 and the digital camera 101 are paired by registering the digital camera 101 with an account created in the management apparatus 102. The processing for pairing the management apparatus 102 and the digital camera 101 is performed through the following sequence, for example.

The digital camera 101 sends information of the digital camera 101 (camera information) to the management apparatus 102, Here, the camera information which is sent includes, for example, a model name of the digital camera 101, a GUID serving as individual information for uniquely identifying the digital camera 101, and the like. Upon the camera information being sent, the management apparatus 102 issues an Alias ID specifically for the digital camera 101, as well as an Access ID and an Access Password used in authentication processing when accessing a server. The Alias ID is generated by the server apparatus 104 in association with the camera information of the digital camera 101 and the user's account, and thus a camera which initiated communication can be uniquely identified by the Alias M.

Through the foregoing processing, a state of pairing is managed by the management apparatus 102 for both the server apparatus 104 and the digital camera 101 on the basis of the Access ID. The digital camera 101 also holds settings information indicating a setting as to whether or not to automatically upload images to the management apparatus 102. When this setting is on, images in the digital camera 101 are automatically uploaded to the management apparatus 102.

It is necessary for the user to create an account to access the image evaluation apparatus 103 and the server apparatus 104. Account information for connecting to the image evaluation apparatus 103 and the server apparatus 104, and settings information indicating settings for whether or not to connect to the image evaluation apparatus 103 and the server apparatus 104, are managed by the management apparatus 102. Settings information indicating settings for whether or not to automatically upload images to the image evaluation apparatus 103 and the server apparatus 104, and settings information indicating settings for whether or not to perform image evaluation using the image evaluation apparatus 103, are also managed by the management apparatus 102. Furthermore, settings information indicating settings for whether or not to automatically register images in the server apparatus 104 is managed by the management apparatus 102 as well.

For example, when the image evaluation apparatus 103 is registered as a connection destination, the setting for automatic uploading is on, and the setting for image evaluation is on, images uploaded from the digital camera 101 are sent to the image evaluation apparatus 103 via the management apparatus 102. At that time, the management apparatus 102 may send each image to the image evaluation apparatus 103 along with a UUID for uniquely identifying that image. Alternatively, the management apparatus 102 may request the image evaluation apparatus 103 to issue a WAD for uniquely identifying each image, and images received from the management apparatus 102 may be managed along with the UUIDs. The image evaluation apparatus 103 determines whether or not each image received from the management apparatus 102 meets a predetermined standard in accordance with a predetermined algorithm. For an image determined to meet the predetermined standard, the image evaluation apparatus 103 sends the UUID of that image to the management apparatus 102. Having received the UUID, the management apparatus 102 registers the image corresponding to that UUID in the server apparatus 104 so that the image can be viewed by a specific member. Note that the management apparatus 102 may prompt the user, in advance, to confirm whether it is acceptable to register the image in the server apparatus 104, FIG. 2A is a block diagram illustrating the configuration of the digital camera 101, FIG. 2B is a diagram illustrating the external appearance of the digital camera. 101 from the front, and FIG. 2C is a diagram illustrating the external appearance of the digital camera 101 from the rear.

Figure 2A:
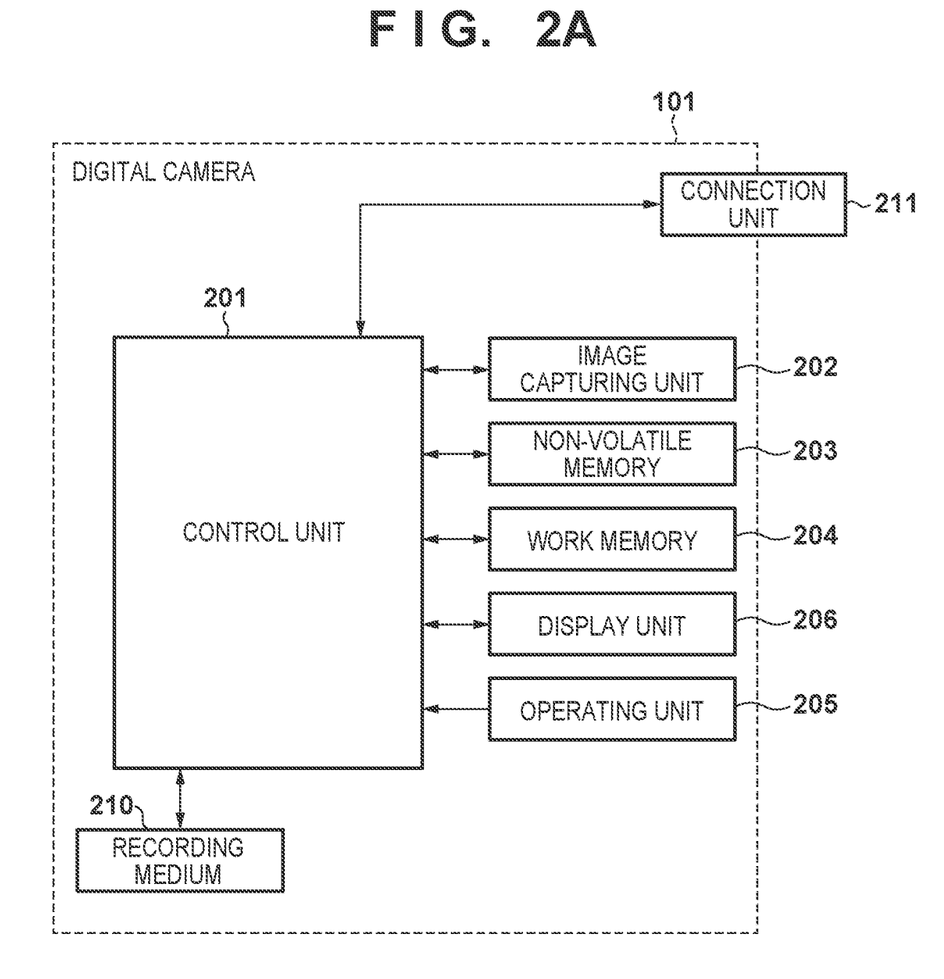
FIG. 2A is a block diagram illustrating the configuration of the digital camera 101.
Figure 2B:
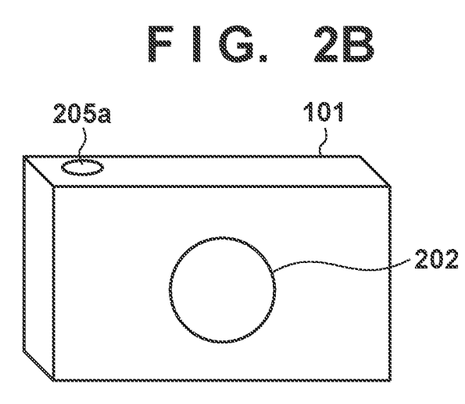
FIG. 2B is a diagram illustrating the external appearance of the digital camera 101 from the front.
Figure 2C:
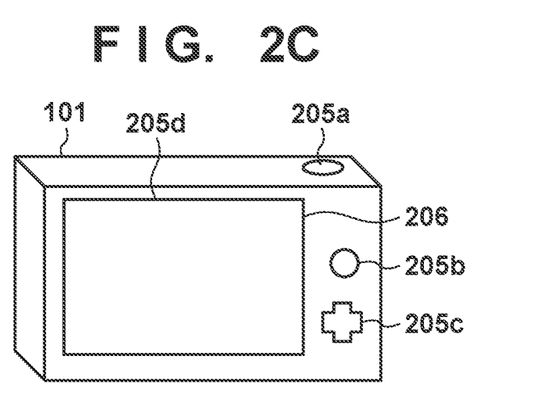
FIG. 2C is a diagram illustrating the external appearance of the digital camera 101 from the rear.

First, with reference to FIG. 2A, the digital camera 101 includes a control unit 201. The control unit 201 controls the digital camera 101 in accordance with programs (described later). An image capturing unit 202 includes an optical system and an image sensor, for example. The optical system includes an optical lens unit, and controls aperture, zoom, focus, and the like. The image sensor outputs an electrical signal based on an optical image formed through the optical lens unit. A Complementary Metal Oxide Semiconductor (CMOS) sensor or a Charge Coupled Device (CCD) is used as the image sensor. The image capturing unit 202 performs noise reduction processing. A/D conversion, and the like on the electrical signal and outputs image data.

The image data output from the image capturing unit 202 is temporarily recorded into buffer memory. The control unit 201 records the image data into a recording medium 210 in accordance with the Design Rule for Camera File System (DCF) standard.

Programs and the like executed by the control unit 201 are recorded in note volatile memory 203. Work memory 204 is used as buffer memory, image display memory, a work area for the control unit 201, and the like.

An operating unit 205 is operated by the user, and the user makes instructions to the digital camera 101 using the operating unit 205. For example, the operating unit 205 includes a power button for turning the power of the digital camera 101 on and off, a release switch for instructing shooting, and a playback button used when playing back image data. The operating unit 205 also includes a connect button and the like operated when starting communication with an external device via a connection unit 211 (described later). The operating unit 205 further includes operating members such as a touch panel provided in a display unit 206.

Note that the release switch is provided with a first shutter switch SW1 and a second shutter switch SW2. The first shutter switch SW1 turns on when the release switch enters what is known as a "half-pressed" state. As a result, the control unit 201 commences shooting preparations such as AF (autofocus) processing, AE (autoexposure) processing, AWB (auto white balance) processing, EF (flash pre-emission) processing, and the like. Meanwhile, the second shutter switch SW2 turns on when the release switch enters what is known as a "fully-pressed" state. As a result, the control unit 201 commences shooting.

A viewfinder image is displayed in the display unit 206 during shooting. Images obtained as a result of shooting, and text for interactive operations, are displayed in the display unit 206 as well. Note that the display unit 206 does not absolutely need to be provided in the digital camera 101. For example, a configuration can also be employed in Which the digital camera 101 is connected to an external display apparatus and the display apparatus displays the images and the like.

As described above, image data obtained by the image capturing unit 202 is recorded into the recording medium 210. The recording medium 210 may be configured to be removable from the digital camera 101, or may be built into the digital camera 101.

The connection unit 211 is an interface for connecting the digital camera 101 to an external apparatus. Here, the digital camera 101 can perform two-way communication with the management apparatus 102, which is one external apparatus, via the connection unit 211. For example, the digital camera 101 sends image data obtained by the image capturing unit 202 to the management apparatus 102 via the connection unit 211.

Note that the connection unit 211 includes an interface for communicating using wireless LAN compliant with the IEEE 802.11 standard. The communication method is not limited to communication using wireless LAN, however, and may be communication using infrared light.

The connection unit 211 included in the digital camera 101 has an AP mode, for functioning as an access point (AP) in infrastructure mode, and a CL mode, for functioning as a client in infrastructure mode. By operating the connection unit 211 in CL mode, the digital camera 101 can operate as a CL device in infrastructure mode.

When the digital camera 101 operates as a CL device, the digital camera 101 can join a network formed by a neighboring AP device by connecting to the AP device. In addition, by operating the connection unit 211 in AP mode, the digital camera 101 can operate as a simple AP (hereinafter referred to as "simple AP") which is a kind of AP but has limited functions.

When the digital camera 101 operates as a simple AP, the digital camera 101 forms a network by itself. A device in the vicinity of the digital camera 101 can recognize the digital camera 101 as an AP device and join a network formed by the digital camera 101. A program for causing the digital camera 101 to function as described above is held in the non-volatile memory 203.

Note that the digital camera 101 is a simple AP that, while being a kind of AP, does not have a gateway function for transferring data received from a CL device to an Internet provider or the like. Accordingly, even if data is received from another device that has joined the network formed by the digital camera 101, the digital camera 101 cannot transfer that data to a network such as the Internet.

As illustrated in FIGS. 2B and 2C, a release switch 205a is disposed on an upper surface of a housing of the digital camera 101. A playback button 205b, a directional key 205c, and the display unit 206 are disposed on a rear surface of the housing of the digital camera 101, and a touch panel 205d is disposed upon the display unit 206.

Figure 3:
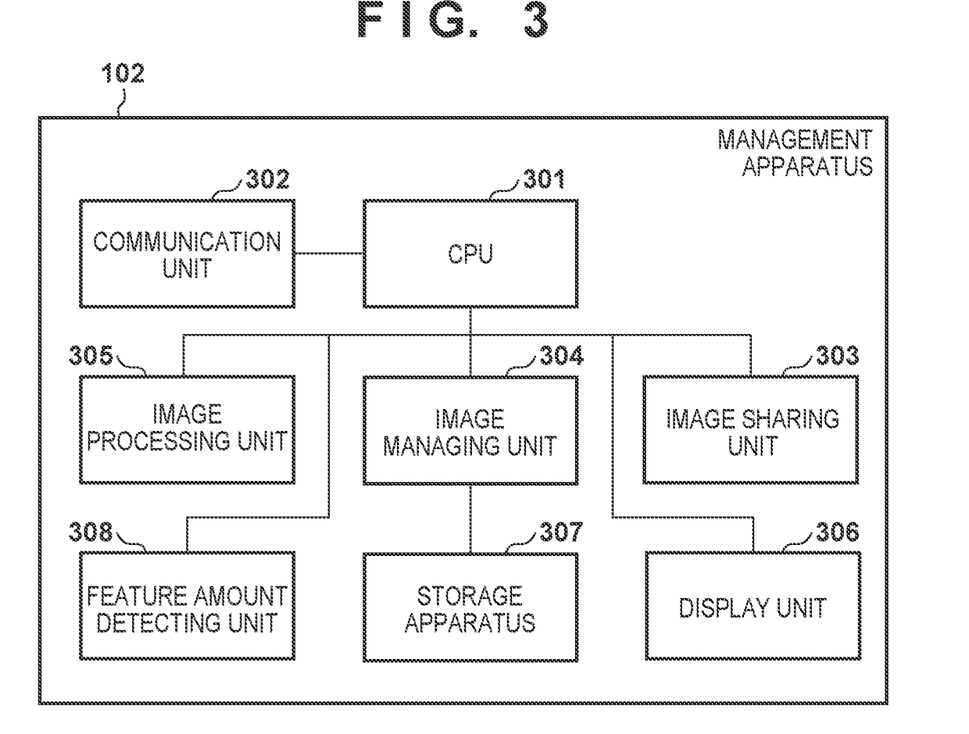
FIG. 3 is a block diagram illustrating the configuration of the management apparatus 102.

FIG. 3 is a block diagram illustrating the configuration of the management apparatus 102. The management apparatus 102 includes a CPU 301, a communication unit 302, an image sharing unit 303, an image managing unit 304, an image processing unit 305, a display unit 306, a storage apparatus 307, and a feature amount detecting unit 308.

The communication unit 302 connects to an external apparatus and exchanges control commands, data, and the like with the external apparatus. For example, the communication unit 302 receives the image data, account information, and the like sent from the digital camera 101. Additionally, the communication unit 302 sends the account information for accessing the image evaluation apparatus 103, image data, the UUIDs for uniquely identifying images, and the like.

The CPU 301 controls the various units of the management apparatus 102 on the basis of the received information. The feature amount detecting unit 308 detects a feature amount from the image data obtained from the communication unit 302. The feature amount detecting unit 308 may also receive data pertaining to the feature amount detection, received from the image evaluation apparatus 103 by the communication unit 302.

The image processing unit 305 generates an image by performing predetermined image processing on a region of the feature amount detected by the feature amount detecting unit 308. For example, the image processing unit 305 generates an image in which a brand logo or the like has been deleted so that the image can be registered directly in the server apparatus 104. The generated image is saved in the storage apparatus 307.

The image managing unit 304 manages data such as the image data obtained by the communication unit 302, the UUIDs for uniquely identifying images, the data pertaining to feature amount detection, images corrected by the image processing unit 305, and the like.

The display unit 306 displays the image data obtained by the communication unit 302, images corrected by the image processing unit 305, and the like. A display apparatus such as an LCD, an organic EL device, or the like is used as the display unit 306. The display unit 306 does not have to be provided in the management apparatus 102, and the management apparatus 102 may instead have a display control function for controlling displays in an external display unit.

The image sharing unit 303 is used to share data managed by the image managing unit 304 with a third party. The image sharing unit 303 uses not only image data, but also information such as information identifying individuals for sharing images, information of locations where images were shot, event information, and the like.

Figure 4:
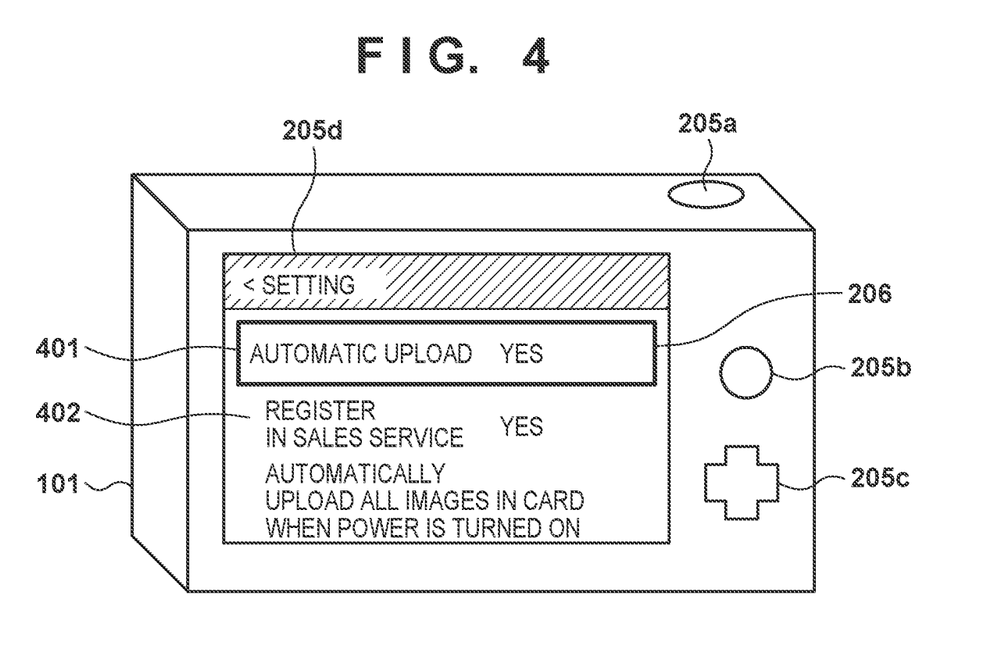
FIG. 4 is a diagram illustrating an example of a settings screen of the digital camera 101.

FIG. 4 is a diagram illustrating an example of a settings screen of the digital camera 101. A setting item 401 for setting whether or not to automatically upload images to the management apparatus 102 is displayed in the settings screen. When the automatic upload setting is "yes" (or "on"), images stored in the digital camera 101 are automatically uploaded to the management apparatus 102. However, when the automatic upload setting is "no" (or "off"), images stored in the digital camera 101 remain stored only in the digital camera 101. Although FIG. 4 illustrates an example in which images within the recording medium 210 are automatically uploaded, the digital camera 101 may be configured so that the user can select which images to upload.

A setting item 402 for setting whether or not to register images in the server apparatus 104 (a sales service) is also displayed in the settings screen. When the registration setting is "yes" (or "on"), the digital camera 101 adds information indicating that the user consents to having the image registered in the server apparatus 104 (consent information) to the images uploaded to the management apparatus 102.

Figure 5:
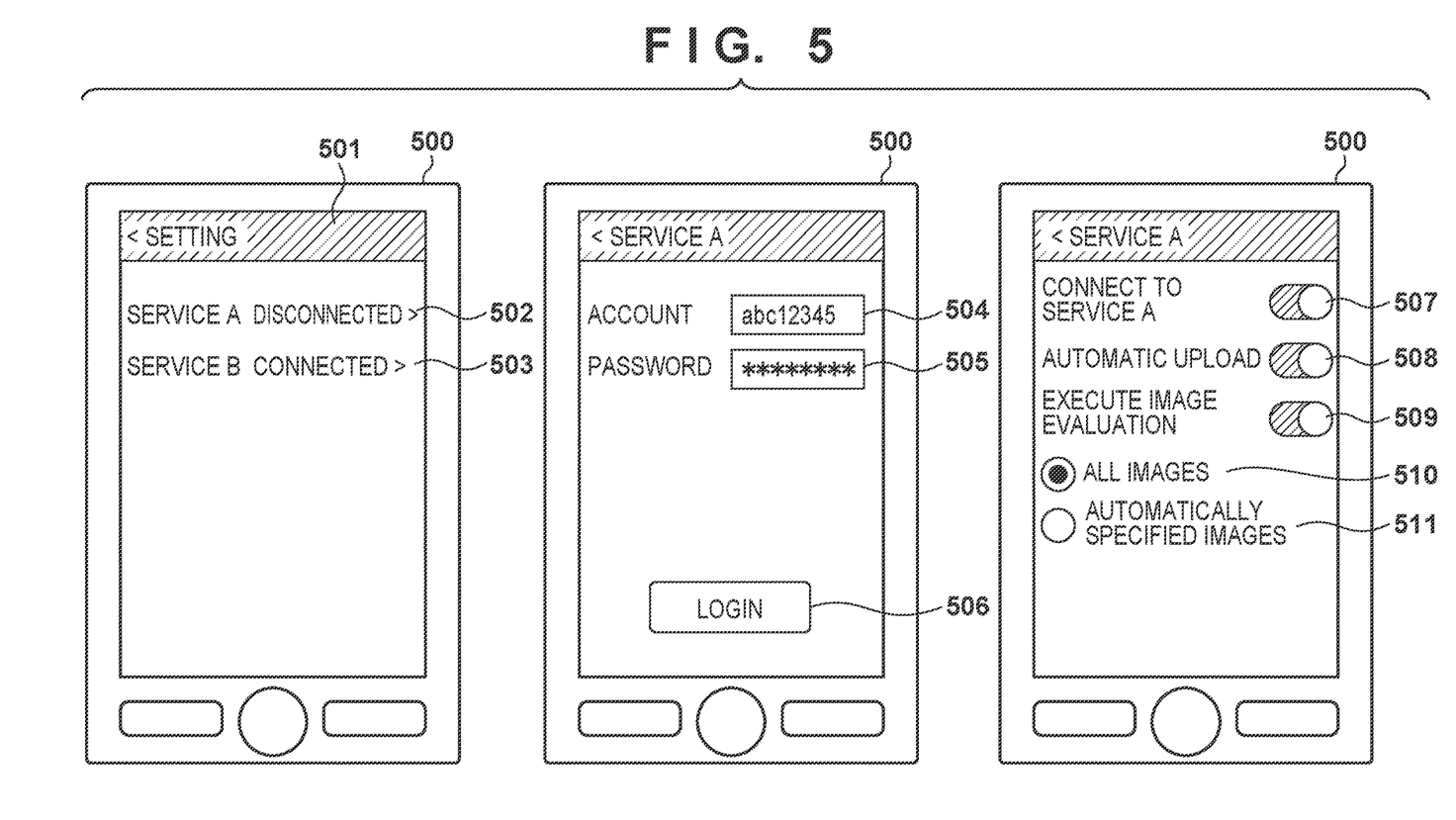
FIG. 5 is a diagram illustrating a screen of a mobile app for setting the management apparatus 102.

FIG. 5 is a diagram illustrating a screen of a mobile app for setting the management apparatus 102. The mobile app is run by a smartphone 500, for example. A settings screen 501 illustrated in the left side of FIG. 5 is a menu for setting to which service the management apparatus 102 is to upload images. In the example illustrated in FIG. 5, a service A is disconnected, as indicated by reference sign 502, whereas a service B is connected, as indicated by reference sign 503.

A sequence through which the management apparatus 102 connects to the service A will be described next. When the user selects a region corresponding to reference sign 502, the app transitions to a screen for logging in to the service A (in the middle of FIG. 5). Reference sign 504 indicates a control for entering an account name for accessing the service A. Reference sign 505 indicates a control for entering a password corresponding to the account name. When the user enters an account name and password and then presses a login button 506, the management apparatus 102 attempts to log in to the service A.

If the login to the service A succeeds, a screen for specifying advanced settings for the service A is displayed, as indicated in the right side of FIG. 5. A setting item 507 is a setting item for setting whether to connect to the service A. Here, the connection to the service A is set to "on", and thus the connection state of the service A, indicated by reference sign 502, changes from "disconnected" to "connected". Note that the management apparatus 102 may be configured to be capable of connecting to a plurality of services simultaneously, or may be configured to be capable of connecting to only one service at a time. In the latter case, when the connection state of the service A, indicated by reference sign 502, changes from "disconnected" to "connected", the connection state of the service B, indicated by reference sign 503, changes from "connected" to "disconnected".

The following descriptions will assume that the service A is an image evaluation service provided by the image evaluation apparatus 103. A setting item 505 is a setting item for setting whether or not to automatically upload images from the management apparatus 102 to the image evaluation apparatus 103. When the setting item 505 is set to "on", images uploaded from the digital camera 101 to the management apparatus 102 are automatically uploaded to the image evaluation apparatus 103. When the setting item 508 is set to "off", the user can choose images displayed by the mobile app and upload desired images to the image evaluation apparatus 103.

A setting item 509 is a setting item for setting whether or not to request the image evaluation apparatus 103 to perform image evaluation. When the setting item 509 is set to "on" and "all images", indicated by reference sign 510, is selected, the image evaluation apparatus 103 evaluates whether or not an image meets a predetermined standard for all images received from the management apparatus 102. The "predetermined standard" is a standard that can be used as a standard for determining whether or not to register an image in the server apparatus 104. The predetermined standard is, for example, a standard set to be met by images for which the likelihood that another user will purchase the image is greater than or equal to a threshold. However, the predetermined standard is not limited to such a standard. When the setting item 509 is set to be "on" and "automatically specified images", indicated by reference sign 511, is selected, the management apparatus 102 automatically specifies whether or not each image is to be evaluated on the basis of metadata of each image. The image evaluation apparatus 103 evaluates whether or not the image specified to be evaluated by the management apparatus 102 meets the predetermined standard. When the setting item 509 is set to "off", the images sent to the image evaluation apparatus 103 from the management apparatus 102 are not evaluated.

Figure 6A:
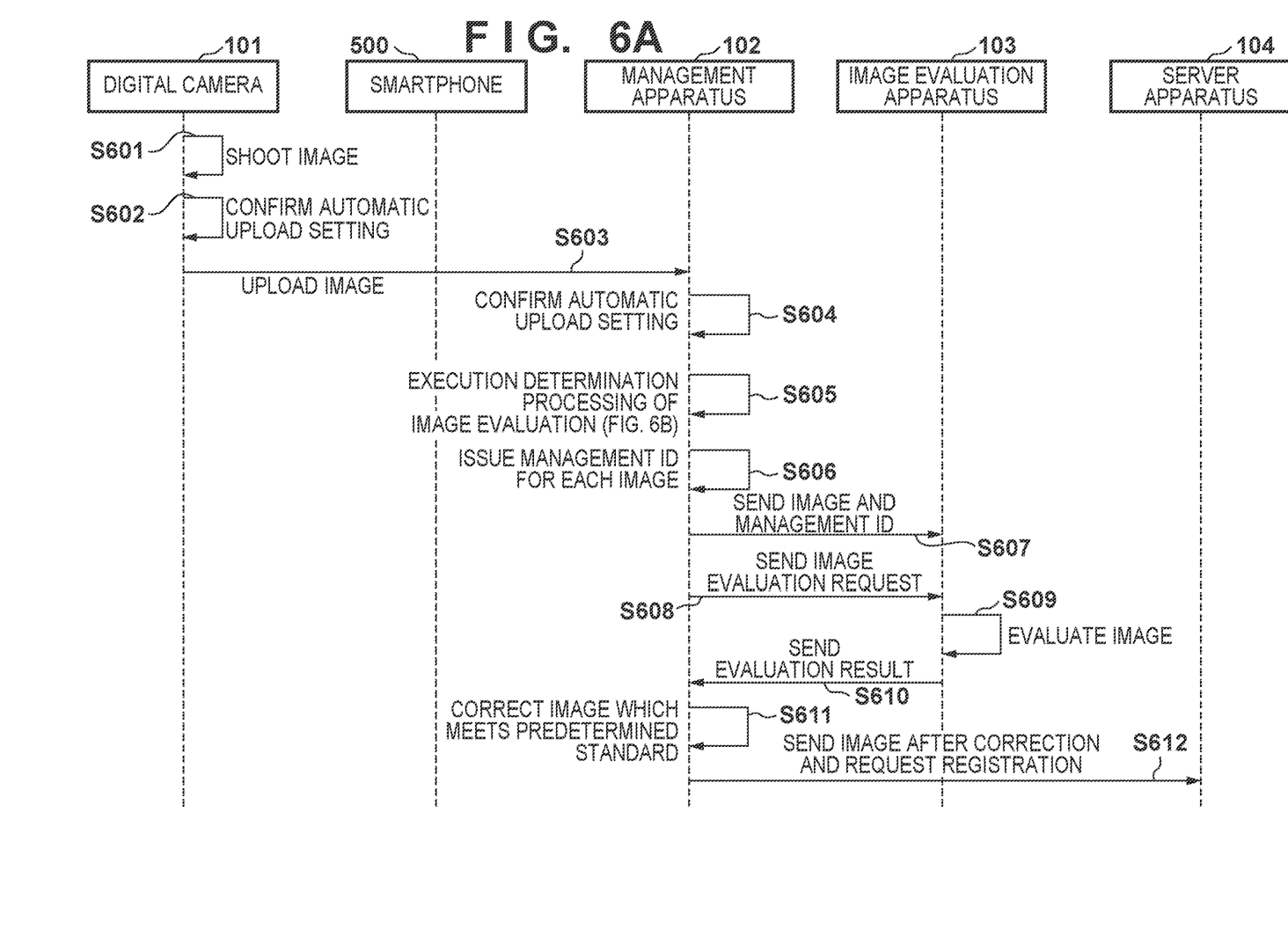
FIG. 6A is a sequence chart illustrating a series of processing for registering an image shot by the digital camera 101 in the server apparatus 104.

FIG. 6A is a sequence chart illustrating a series of processing for registering an image shot by the digital camera 101 in the server apparatus 104.

In step S601, the digital camera 101 shoots an image and stores the image in the recording medium 210. In step S602, the digital camera 101 confirms whether the setting for automatically uploading images (the setting item 401 in FIG. 4) is set to "yes" or "no" for "on" or "off").

When the automatic upload setting is "on", in step S603, the digital camera 101 uploads the image stored in the recording medium 210 to the management apparatus 102. At this time, if the setting for image registration (the setting item 402 in FIG. 4) is set to "yes" (or "on"), the digital camera 101 adds the consent information to the image. Although not illustrated in FIG. 6, the management apparatus 102 also sends information indicating whether or not the image was successfully received to the digital camera 101. When the management apparatus 102 has successfully received the image, the digital camera 101 manages the fact that the image has been successfully uploaded to the management apparatus 102. When the automatic upload setting is "off", the processing in the sequence chart ends without the image stored in the recording medium 210 being uploaded. Note that the smartphone 500 may function as an access point for the digital camera 101 in the communication between the digital camera 101 and the management apparatus 102 performed in step S603.

In step S604, the management apparatus 102 confirms whether the automatic uploading setting for the connected service (the setting item 508 in FIG. 5) is set to "on" or "off" (or "yes" or "no"). In step S605, the management apparatus 102 performs image evaluation execution determination processing. The execution determination processing will be described in detail later with reference to FIG. 6B. In step S606, for each image to be sent to the image evaluation apparatus 103, the management apparatus 102 issues, as a management ID, a UUID that uniquely identifies the image.

If it has been determined in step S604 that the automatic upload setting is "on", in step S607, the management apparatus 102 sends the image and the management ID to the image evaluation apparatus 103. However, if it has been determined in step S604 that the automatic upload setting is "off", the processing of this sequence chart ends without the image and the management ID being sent.

Although an example in which the management apparatus 102 issues a management ID uniquely identifying the image and sends the management ID to the image evaluation apparatus 103 is described here, the management apparatus 102 may request the image evaluation apparatus 103 to issue the management ID. In this case, the image evaluation apparatus 103 issues the management ID for a received image, and sends the management ID to the management apparatus 102.

When it is determined in step S605 that the image evaluation is to be executed, in step S608, the management apparatus 102 sends an image evaluation request to the image evaluation apparatus 103. However, when it is determined in step S605 that the image evaluation is not to be executed, the processing of the sequence chart ends without the image evaluation request being sent.

Note that the management apparatus 102 may be configured so as not to upload an image when the image evaluation is not to be executed. In other words, the management apparatus 102 may be configured to not perform the processing of step S607 when it is determined in step S605 that the image evaluation is not to be executed, even if it is determined in step S604 that the automatic upload setting is "on". This makes it possible to reduce the amount of data flowing in the communication channel between the management apparatus 102 and the image evaluation apparatus 103. Particularly when the communication channel is used for other data transfer as well, reducing the amount of data in the communication channel makes it possible to effectively utilize limited communication channel resources, regardless of whether the communication is wired or wireless.

Having received the image evaluation request, in step S609, the image evaluation apparatus 103 determines whether or not the image satisfies the predetermined standard (e.g., whether or not the likelihood that the image will be purchased by another user is greater than or equal to the threshold).

In step S610, the image evaluation apparatus 103 sends an image evaluation result to the management apparatus 102. In addition to information indicating whether or not the image meets the predetermined standard, the evaluation result includes the management ID of the image. The management apparatus 102 can recognize to which image the evaluation result corresponds on the basis of the management ID included in the evaluation result. The evaluation result may also include a filename of the image, correction advice (information indicating a correction method), and the like. Alternatively, the image evaluation apparatus 103 itself may correct the image on the basis of the correction advice and return the corrected image to the management apparatus 102.

In step S611, the management apparatus 102 corrects the image which meets the predetermined standard on the basis of the evaluation result received in step S610. Here, before executing the correction, the management apparatus 102 may confirm with the user whether or not to execute the correction. An example of a screen for confirming whether to execute the correction will be described later with reference to FIG. 7A. Additionally, at this time, the management apparatus 102 may present the pre-correction and post-correction images to the user. An example of a screen for displaying the pre- and post-correction images will be described later with reference to FIG. 7B.

When the image meets the predetermined standard and the image includes the consent information, in step S612, the management apparatus 102 sends the post-correction image to the server apparatus 104 and requests the server apparatus 104 to register that image. Here, before the image is registered in the server apparatus 104, the management apparatus 102 may prompt the user to confirm whether or not it is acceptable to register the image.

Figure 6B:
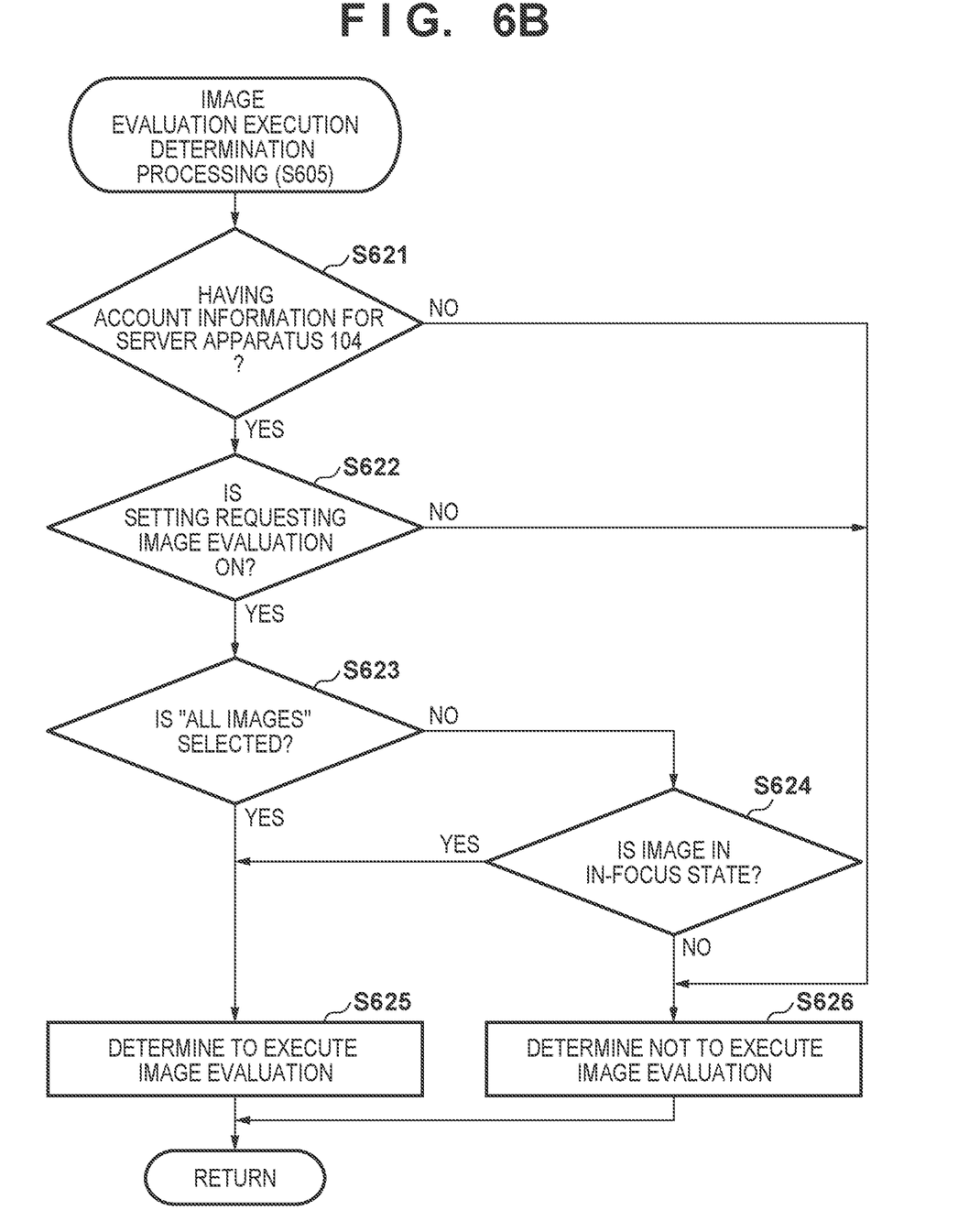
FIG. 6B is a flowchart illustrating details of image evaluation execution determination processing step S605 in FIG. 6A).

FIG. 6B is a flowchart illustrating details of the image evaluation execution determination processing (step S605 in FIG. 6A). In step S621, the management apparatus 102 determines whether or not there is account information for accessing the server apparatus 104. When there is account information, the sequence moves to step S622, whereas when there is no account information, the sequence moves to step S626.

In step S622, the management apparatus 102 determines whether or not a setting requesting the image evaluation (the selling item 509 in FIG. 5) is "on". When the setting requesting the image evaluation is "on", the sequence moves to step S623, whereas when the setting requesting the image evaluation is "off", the sequence moves to step S626.

In step S623, the management apparatus 102 determines wheeler or not "all images" (reference signs 510 in FIG. 5) are selected for evaluation. When "all images" is selected, the sequence moves to step S625, whereas when such is not the case (when "automatically specified images", indicated by reference signs 511 in FIG. 5, is selected), the sequence moves to step S624.

In step S624, the management apparatus 102 determines whether or not the image is in an in-focus state. Here, to determine whether or not the image is in an in-focus state, the management apparatus 102 uses focus state metadata which has been additionally recorded in the image data managed by the image managing unit 304. This focus state metadata is additionally recorded in the image data as focus control information of the image capturing unit 202 when the image data is captured and recorded by the digital camera 101. When the image is in an in-focus state, the sequence moves to step S625, whereas when the image is not in an in-focus state, the sequence moves to step S626.

In step S625, the management apparatus 102 determines to execute the image evaluation. On the other hand, in step S626, the management apparatus 102 determines not to execute the image evaluation.

Incidentally, in the example illustrated in FIG. 6B, Whether or not to execute the image evaluation by the image evaluation apparatus 103 is determined by using the focus state metadata as described in step S624. In other words, in the example illustrated in FIG. 6B, the image being in an in-focus state is included in the "predetermined standard" pertaining to whether or not to register the image in the server apparatus 104. In this case, for an image which is not in an in-focus state, the management apparatus 102 can determine not to register the image in the server apparatus 104, without even going as far as evaluating the image with the image evaluation apparatus 103. This makes it possible to lighten the processing load on the image evaluation apparatus 103.

In the example illustrated in FIG. 6B, the management apparatus 102 uses the focus state metadata as the metadata (additional information) of the image, as described in step S624. However, the management apparatus 102 may use other metadata additionally recorded in the image data as a control state of the image capturing unit 202 when the image data is captured and recorded by the digital camera 101, For example, the management apparatus 102 may use focus adjustment amount metadata pertaining to a focus position used when the image is shot, and may determine that the image evaluation is to be performed when the focus adjustment amount is less than or equal to a threshold. This makes it possible to set even image data having an amount of blur that is within a predetermined range to be subject to image evaluation (i.e., as a candidate for an image to be registered in the server apparatus 104). As another example, the management apparatus 102 may use face detection state metadata indicating whether or not a face is detected when the image is shot. This makes it possible to selectively set an image including a detected face, or an mage not including a detected face, to be subject to image evaluation (i.e., as a candidate for an image to be registered in the server apparatus 104). As another example, the management apparatus 102 may use standard exposure state metadata indicating whether or not an image has been shot in a standard exposure state. This makes it possible to set only image data shot in the standard exposure state to be subject to image evaluation (i.e., as a candidate for an image to be registered in the server apparatus 104). As another example, the management apparatus 102 may use adjustment amount metadata indicating an exposure adjustment amount relative to the standard exposure state used when shooting an image, and may determine that image evaluation is to be performed when the exposure adjustment amount is less than or equal to a threshold. This makes it possible to set even image data having an exposure state that is within a predetermined range to be subject to image evaluation as a candidate for an image to be registered in the server apparatus 104). As another example, the management apparatus 102 may use tilt state metadata indicating a tilt state when an image is shot, the tilt state being detected by a level provided in the digital camera 101. This makes it possible to set only image data having a tilt that is within a predetermined range, fir example, to be subject to image evaluation (i.e., as a candidate for an image to be registered in the server apparatus 104).

Alternatively, the management apparatus 102 may generate information equivalent to the metadata additionally recorded when an image is shot and recorded by the digital camera 101 as described above, and may use that information in the determination processing of step S624. The information generated by the management apparatus 102 may then be associated with the image data as tag information, and that tag information may be used in the determination processing of step S624.

Figure 7A:
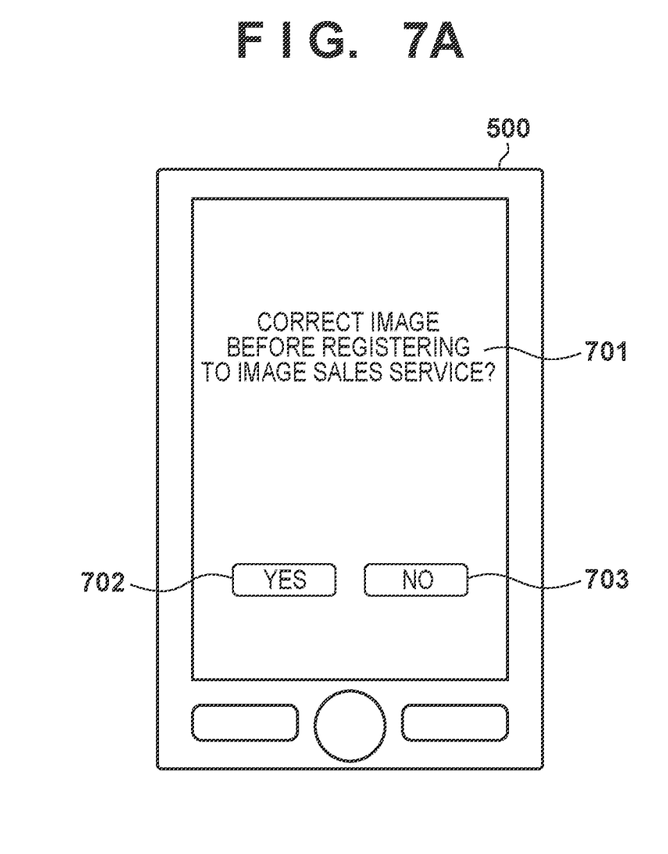
FIG. 7A is a diagram illustrating an example of a screen for confirming the execution of correction performed in step S611 of FIG. 6A.

FIG. 7A is a diagram illustrating an example of a screen for confirming the execution of correction performed in step S611 of FIG. 6A. The smartphone 500 displays a screen 701, in which a confirmation message pertaining to whether or not to correct the image before registering the image in the server apparatus 104 is displayed, in response to an instruction from the management apparatus 102. If the user selects a button 702 ("no"), the management apparatus 102 registers the image in the server apparatus 104 (the image sales service) without correcting the image. However, if the user selects a button 703 ("yes"), the management apparatus 102 corrects the image.

Figure 7B:
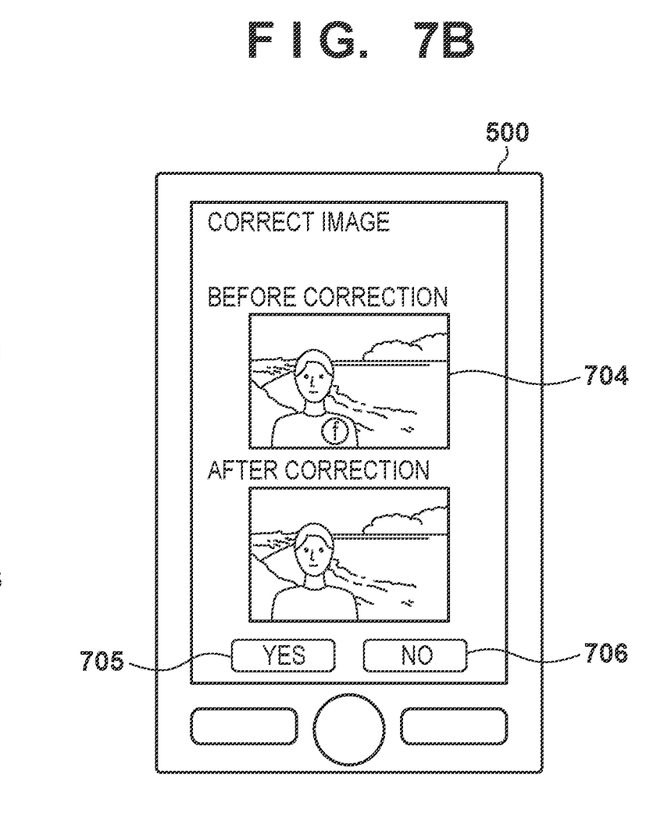
FIG. 7B is a diagram illustrating an example of a screen for displaying images before and after the correction performed in step S611 of FIG. 6A.

FIG. 7B is a diagram illustrating an example of a screen for displaying images before and after the correction performed in step S611 of FIG. 6A. The smartphone 500 displays a screen 704, in which the pre-correction image and the post-correction image are displayed, in response to an instruction from the management apparatus 102. In the example illustrated in FIG. 7B, a brand logo which was present in the pre-correction image has been deleted in the post-correction image. In this example, it is necessary to delete the brand logo before registering the image in the image sales service.

To perform this correction, the management apparatus 102 uses the feature amount detecting unit 308 to detect the brand logo, and uses the image processing unit 305 to correct the image. Alternatively, the management apparatus 102 may receive information indicating a region where the brand logo is present as an evaluation result from the image evaluation apparatus 103, and may use the image processing unit 305 to perform the correction on the basis of that information. As yet another example, the image evaluation apparatus 103 may perform the necessary correction, and the management apparatus 102 may receive and display the image corrected by the image evaluation apparatus 103.

Additionally, a configuration may be employed in which when the correction performed automatically by the management apparatus 102 or the image evaluation apparatus 103 is insufficient (i.e., the necessary correction has not been performed), the user can perform correction manually at a later time.

If the user selects a button 705 ("yes") in the screen 704, the management apparatus 102 registers the post-correction image in the server apparatus 104 (the image sales service). However, if the user selects a button 706 ("no"), the correction is canceled, and the smartphone 500 displays a screen for confirming whether or not to register the pre-correction image in the server apparatus 104.

Figure 8:
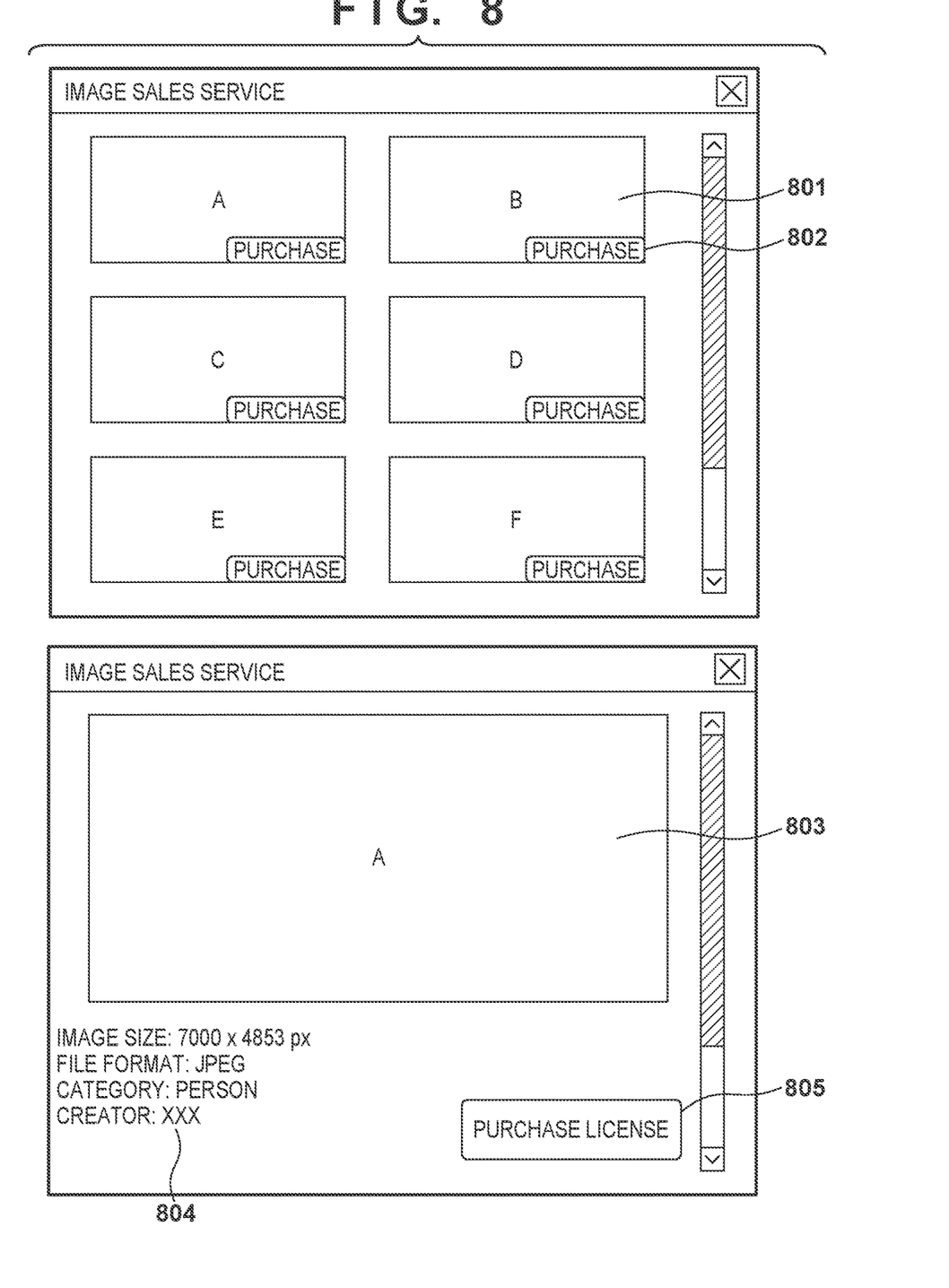
FIG. 8 is a diagram illustrating an image sale screen.

FIG. 8 is a diagram illustrating an image sale screen. When a user who wishes to purchase an image accesses the server apparatus 104 using an information processing apparatus such as a PC, the image sale screen is displayed in a display of the information processing apparatus.

Multiple pieces of content 801, such as images and moving images for sale, as well as multiple buttons 802 for purchasing corresponding licenses, are displayed as a list in the image sale screen. For example, when the user selects a button for purchasing an image A, a larger image preview 803, and metadata 804 such as shooting information, annotations, and the like of the image, are displayed. When the user wishes to purchase that image, they select a button 805 for purchasing a license.

As described thus far, according to the first embodiment, the management apparatus 102 receives an image from the digital camera 101, and on the basis of additional information included in the image, determines whether or not the image is to be evaluated with respect to the likelihood that another user will purchase the image. When it is determined that the image is to be evaluated, the management apparatus 102 sends the received image and an image evaluation request to the image evaluation apparatus 103, and receives an evaluation result from the image evaluation apparatus 103. Then, when the evaluation result indicates that the likelihood satisfies a predetermined standard (the likelihood of the image being purchased is greater than or equal to a first threshold) and the image includes consent information, the management apparatus 102 registers the image in the server apparatus 104. This makes it possible to prompt a user to register, in an image sales service, an image having a relatively high likelihood of being purchased by another user, while suppressing a burden on the user.

Second Embodiment

Although the first embodiment has described a configuration in which the user makes settings in the management apparatus 102 using the smartphone 500 (see FIG. 5), a second embodiment will describe a configuration in which the user makes settings in the management apparatus 102 using the digital camera 101. In the second embodiment, the basic configuration of the system is the same as in the first embodiment (see FIGS. 1 to 3). The following will primarily describe areas that are different from the first embodiment.

Figure 9:
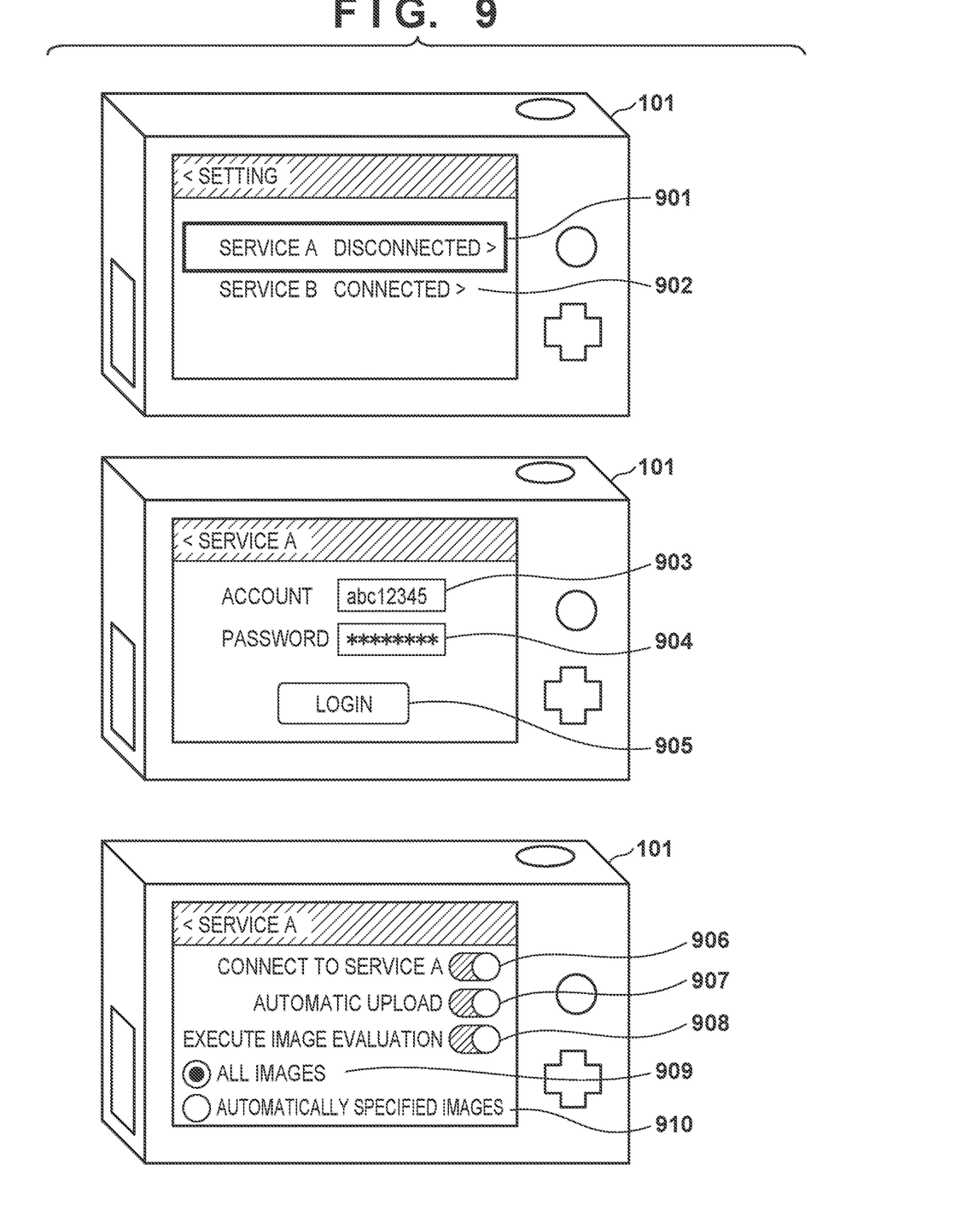
FIG. 9 is a diagram illustrating a settings screen for setting the management apparatus 102 through the digital camera 101.

FIG. 9 is a diagram illustrating a settings screen for setting the management apparatus 102 through the digital camera 101. Setting items 901 and 902, indicated in the upper section of FIG. 9, are setting items for setting to which service the digital camera 101 is to upload images. In the example illustrated in FIG. 9, the service A is disconnected, as indicated by the setting item 901, whereas the service B is connected, as indicated by the setting item 902.

A case of connecting to the service A, which corresponds to the setting item 901, will be described here. When the user selects the setting item 901, the screen transitions to a screen for logging in to the service A (the middle section in FIG. 9). Reference signs 903 and 904 indicate controls for entering an account name and a password for accessing the service A. When the user enters an account name and password and then selects a login button 905, the digital camera 101 attempts to log in to the service A.

If the login to the service A succeeds, a screen for specifying advanced settings for the service A is displayed, as indicated in the lower section of FIG. 9. A setting item 906 is a setting item for setting whether to connect to the service A. Here, the connection to the service A is set to "on", and thus the connection state of the service A, indicated by the setting item 901, changes from "disconnected" to "connected". Note that the management apparatus 102 may be configured to be capable of connecting to a plurality of services simultaneously, or may be configured to be capable of connecting to only one service at a time. In the latter case, when the connection state of the service A, indicated by the setting item 901, changes from "disconnected" to "connected", the connection state of the service B, indicated by the setting item 902, changes from "connected" to "disconnected".

The following descriptions will assume that the service A is an image evaluation service provided by the image evaluation apparatus 103. A setting item 907 is a setting item for setting whether or not to automatically upload images from the management apparatus 102 to the image evaluation apparatus 103. When the setting item 907 is set to "on", images uploaded from the digital camera 101 to the management apparatus 102 are automatically uploaded to the image evaluation apparatus 103, When the setting item 907 is set to "off", the user can choose images displayed in the digital camera 101 and upload desired images to the image evaluation apparatus 103.

A setting item 908 is a setting item for setting whether or not to request the image evaluation apparatus 103 to perform image evaluation. When the setting item 908 is set to "on" and "all images", indicated by reference sign 909, is selected, the image evaluation apparatus 103 evaluates whether or not an image meets a predetermined standard for all images received from the management apparatus 102. When the setting item 908 is set to be "on" and "automatically specified images", indicated by reference sign 910, is selected, the management apparatus 102 automatically specifies whether or not each image is to be evaluated on the basis of metadata of each image. The image evaluation apparatus 103 evaluates whether or not the image specified to be evaluated by the management apparatus 102 meets the predetermined standard. When the setting item 908 is set to "off", the images sent to the image evaluation apparatus 103 from the management apparatus 102 are not evaluated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020891, filed Feb. 10, 2020, which is hereby incorporated by reference herein in its entirety.

What is claimed is:

1. An image management apparatus comprising:
at least one processor or circuit configured to function as:
a first receiving unit configured to receive an image from a communication apparatus;
a sending unit configured to send the image and an evaluation request for the image to an image evaluation apparatus configured to perform evaluation with respect to likelihood that another user will purchase the image;
a second receiving unit configured to receive an evaluation result for the image from the image evaluation apparatus;
a registering unit configured to register the image in a server apparatus configured to provide an image sales service, in a case where the evaluation result indicates that the likelihood satisfies a predetermined standard and information, which indicates that a user consents to having the image registered in the server apparatus, is set in the image; and
a determining unit configured to determine whether or not the image is to be evaluated,
wherein the sending unit sends the evaluation request for the image to the image evaluation apparatus in a case where it is determined that the image is to be evaluated.

2. The image management apparatus according to claim 1, wherein the determining unit determines that the image is to be evaluated in a case where the image management apparatus has account information for accessing the server apparatus.

3. The image management apparatus according to claim 1, wherein the image includes additional information, and the determining unit determines whether or not the image is to be evaluated on the basis of the additional information.

4. The image management apparatus according to claim 3, wherein the image is an image shot by an image capturing apparatus, and
the additional information includes at least one of information indicating whether or not the image is in an in-focus state, information indicating a focus adjustment amount with respect to a focus position used when the image is shot, information indicating whether or not a face has been detected when the image is shot, information indicating whether or not the image has been shot in a standard exposure state, information indicating an exposure adjustment amount with respect to a standard exposure state when the image is shot, and information indicating a tilt state of the image capturing apparatus when the image is shot.

5. The image management apparatus according to claim 4, wherein the determining unit determines that the image is to be evaluated in a case where the additional information indicates that the image is in an in-focus state.

6. The image management apparatus according to claim 4, wherein the determining unit determines that the image is to be evaluated in a case where the additional information indicates that the focus adjustment amount is less than or equal to a predetermined threshold.

7. The image management apparatus according to claim 1, wherein the at least one processor or circuit is further configured to function as:
a correcting unit configured to, in a case where the registering unit registers the image in the server apparatus, correct the image before the registering.

8. The image management apparatus according to claim 7, wherein the evaluation result includes information indicating a correction method, and
the correcting unit corrects the image in accordance with the correction method indicated by the evaluation result.

9. The image management apparatus according to claim 8, wherein the correcting unit performs correction to delete a brand logo which is present in the image.

10. An image management method executed by an image management apparatus, comprising:
receiving an image from a communication apparatus;
sending the image and an evaluation request for the image to an image evaluation apparatus configured to perform evaluation with respect to likelihood that another user will purchase the image;
receiving an evaluation result for the image from the image evaluation apparatus;
registering the image in a server apparatus configured to provide an image sales service, in a case where the evaluation result indicates that the likelihood satisfies a predetermined standard and information, which indicates that a user consents to having the image registered in the server apparatus, is set in the image; and
determining whether or not the image is to be evaluated,
wherein the evaluation request for the image is sent to the image evaluation apparatus in a case where it is determined that the image is to be evaluated.

11. A non-transitory computer-readable storage medium which stores a program for causing a computer to execute an image management method comprising:
receiving an image from a communication apparatus;
sending the image and an evaluation request for the image to an image evaluation apparatus configured to perform evaluation with respect to likelihood that another user will purchase the image;
receiving an evaluation result for the image from the image evaluation apparatus;
registering the image in a server apparatus configured to provide an image sales service, in a case where the evaluation result indicates that the likelihood satisfies a predetermined standard and information, which indicates that a user consents to having the image registered in the server apparatus, is set in the image; and
determining whether or not the image is to be evaluated,
wherein the evaluation request for the image is sent to the image evaluation apparatus in a case where it is determined that the image is to be evaluated.

* * * * *